July 15, 1924.  1,501,612

W. E. MARTIN

SPRING CLIP FOR TINES FOR SIDE DELIVERY RAKES AND SWATH TURNERS

Filed July 3, 1923

Inventor
William Edward Martin
by Knight Bro
Attorneys

Patented July 15, 1924.

1,501,612

UNITED STATES PATENT OFFICE.

WILLIAM EDWARD MARTIN, OF STAMFORD, ENGLAND.

SPRING CLIP FOR TINES FOR SIDE-DELIVERY RAKES AND SWATH TURNERS.

Application filed July 3, 1923. Serial No. 649,263.

*To all whom it may concern:*

Be it known that I, WILLIAM EDWARD MARTIN, a subject of the King of Great Britain, residing at Rock House, Scotgate, Stamford, in the county of Lincoln, England, have invented a new and useful Improvement in Spring Clips for Tines for Side-Delivery Rakes and Swath Turners, of which the following is a specification.

According to a prior invention I formed the tines for side delivery rakes and swath turners from strips of flat metal of narrow section bent into the form of an inverted U or of half an inverted U, the strips of metal being arranged in planes at right angles to the axis of rotation of the rakes. The object of the prior invention was to construct the tines so that they would not be bent backwards in use and receive a permanent set, thereby fouling the adjacent rake head. Such tines have proved satisfactory in use, but in some cases it may happen that they encounter a rigid obstruction, such as a stone or a root of a tree, in which event, as they cannot be readily bent backwards, they may injure the implement.

The object of the present invention is to construct such rigid tines so that they are capable of giving way under exceptional circumstances and immediately returning to their original position after the obstacle has been passed, the result being that they will not receive a permanent set and, consequently, will not foul adjacent rakes in use.

According to the present invention the tines are connected to the rake head by means of a clip, which is secured by spring pressure sufficient to retain the tine in position for use under normal circumstances, but which will give way should any exceptional stress be put upon the same.

Figure 1:
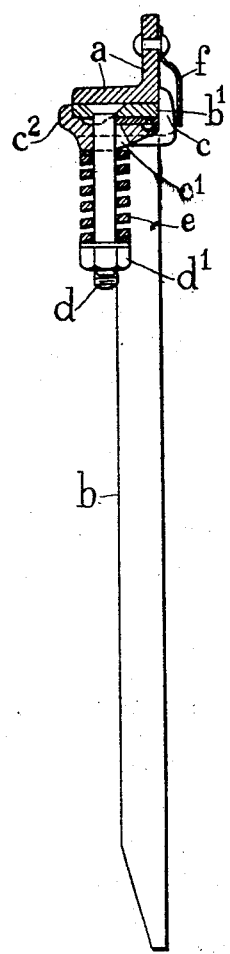
Figure 2:
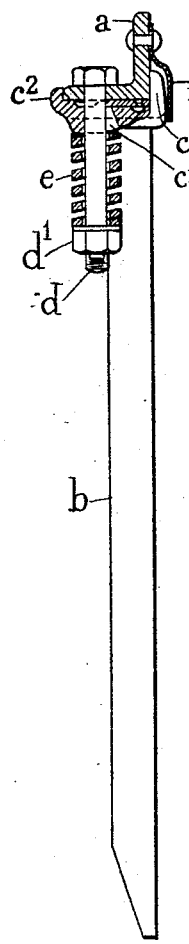
Figure 3:
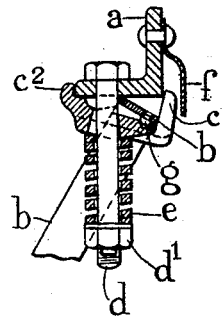
Figure 4:
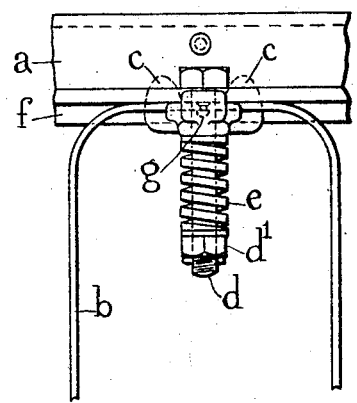
Figure 5:
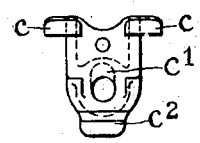
Figure 6:
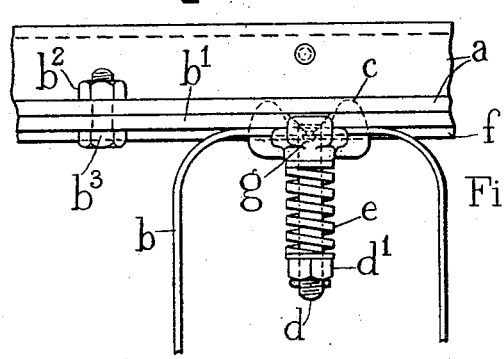

The invention is illustrated in the accompanying drawings in which Fig. 1 is a vertical section through a rake head, spring clip and tine. Fig. 2 is a vertical section through a rake head, spring clip and tine showing a modified construction from Fig. 1. Fig. 3 is a view similar to Fig. 2, but showing the tine moved rearwardly. Fig. 4 is a front elevation of the parts shown in Fig. 2, partly broken away. Fig. 5 is a plan of the spring clip shown separately. Fig. 6 is a front elevation of the parts shown in Fig. 1.

$a$ is part of a rake head and $b$ is a tine made of flat metal of narrow section bent into the form of an inverted U. In carrying the invention into effect as shown in Figs. 2 to 5, the movable clip is formed with two short lugs $c\ c$ upon its front face to fit in front of the rake head $a$, and a long bolt $d$ is passed vertically through the rake head $a$ and clip, behind the tine $b$. This bolt $d$ is sufficiently long to accommodate a coiled spring $e$ between the clip and the nut $d^1$ at the lower end of the bolt $d$. The clip is cut away in front of the bolt $d$ at $c^1$ and is otherwise so shaped that it can rock on its rear edge $c^2$ when an obstacle is encountered by the tine $b$; normally the flat tine $b$ is held firmly between the clip and the rake head $a$. In order to prevent the clip and tine $b$ trapping any hay between them and the rake head, a guard plate $f$ is attached at its upper part to the rake head $a$ and at its lower part it projects forwardly and downwardly on the outside of the lugs $c\ c$ on the clip a sufficient distance to prevent the lugs $c\ c$ passing below the guard plate $f$ when the tine $b$ is moved backwards against the action of the spring $e$ as shown in Fig. 3.

The tine $b$ is preferably formed with a projection $g$ fitting into a recess in the upper face of the clip to assist in preventing the tine moving laterally through the clip due to vibration or other causes.

In the modification of the above construction shown in Fig. 1 the tines $b$ are attached by a bolt $d$ having a countersunk head to a bar $b^1$ which is attached to the angle iron forming the rake head $a$ in any convenient manner, as by a nut $b^2$ and bolt $b^3$ as shown in Fig. 6. This construction allows several of the tines $b$ to be removed from the rake head $a$ together. Each bolt $d$ is provided with a spring $e$, each clip is constructed as described with respect to Figs. 2 to 5 and a guard plate $f$ is also carried by the angle iron or rake head $a$.

What I claim as my invention is:—

1. In a rake for a side delivery rake and swath turner the combination of a rake head, a bolt passing vertically through and fixed to the rake head, a nut on the lower end of the bolt, a perforated movable clip cut away in front of the bolt, a spring surrounding the bolt and located between the nut on the bolt and the said movable clip, through which latter the bolt passes, a flat tine located between the clip and the rake head, a seating on the clip for the flat tine and lugs fitting in front of the rake head, said clip normally pressing the flat tine against the rake head and so formed that it is adapted to rock on its rear edge when the tine encounters an obstruction, substantially as set forth.

2. In a rake for a side delivery rake and swath turner the combination of a rake head, a bolt passing vertically through and fixed to the rake head, a nut on the lower end of the bolt, a perforated movable clip cut away in front of the bolt, a spring surrounding the bolt and located between the said nut and the perforated movable clip through which latter the bolt passes, a flat tine located between the clip and the rake head, a seating on the clip for the flat tine, lugs fitting in front of the rake head and a projection on the tine fitting into a recess in the upper face of the seating, said clip normally pressing the flat tine against the rake head and being so formed that it is adapted to rock on its rear edge when the tine encounters an obstacle, substantially as set forth.

3. In a rake for a side delivery rake and swath turner the combination of a rake head, a bolt passing vertically through and fixed to the rake head, a nut on the lower end of the bolt, a perforated movable clip cut away in front of the bolt, a spring surrounding the bolt and located between the said nut and the perforated movable clip, through which latter the bolt passes, a flat tine located between the clip and the rake head, a seating on the clip for the flat tine, lugs fitting in front of the rake head and a guard plate the upper part of which is attached to the rake head and the lower part of which projects forwardly and downwardly on the outside of the said lugs, substantially as set forth.

4. In a rake for a side delivery rake and swath turner the combination of a rake head, a bar fixed to the rake head, a vertical bolt passing vertically through and fixed to the said bar, a nut on the lower end of the bolt, a perforated movable clip, a spring surrounding the vertical bolt and located between a nut on the bolt and the said clip, through which latter the bolt passes, a flat tine located between the movable clip and the rake head, a seating on the clip for the flat tine and lugs fitting in front of the rake head, said clip normally pressing the flat tine up against the rake head and being so formed that it is adapted to rock on its rear edge when the flat tine encounters an obstruction, substantially as set forth.

5. In a rake for side delivery rake and swath turner the combination of a rake head comprising an angle iron and a bar fixed together, a flat tine located beneath said rake head, a movable clip, pressing said flat tine upwardly against the lower side of the rake head, a downwardly extending bolt fixed to the rake head and passing through the clip, a nut on the lower end of said bolt, and a spring surrounding the bolt between the nut and the clip, the clip being so formed that it will rock upon its rear edge when the tine encounters an obstruction, substantially as set forth.

6. In a side delivery rake and swath turner, the combination with a rake head, of a movable clip having its rear edge in articulate engagement with said rake head, a tine for said rake having a flattened portion thereof interposed between said rake and said clip, and means yieldably retaining said clip in normal position in which said flattened portion of the tine is held against said rake head, said clip being provided with a recess for the reception of a projection carried by said tine.

7. In a side delivery rake and swath turner, the combination with a rake head, of a movable clip having its rear edge in articulate engagement with said rake head, and with lugs movably engaging the forward edge of said rake head, a tine for said rake having a flattened portion thereof interposed between said rake and said clip, means yieldably retaining said clip in normal position in which said flattened portion of the tine is held against said rake head, and a guard plate depending from said rake head in front of said lugs.

In witness whereof I have hereunto set my hand.

WILLIAM EDWARD MARTIN.